(12) United States Patent
    Mizuta

(10) Patent No.: US 8,225,894 B2
(45) Date of Patent: Jul. 24, 2012

(54) UTILITY VEHICLE

(75) Inventor: Fumio Mizuta, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 352 days.

(21) Appl. No.: 12/619,523

(22) Filed: Nov. 16, 2009

(65) Prior Publication Data

US 2011/0115259 A1    May 19, 2011

(51) Int. Cl.
    *B62D 25/12*    (2006.01)
(52) U.S. Cl. ................. 180/69.21; 296/193.11
(58) Field of Classification Search ............... 180/69.2, 180/69.21, 69.22, 69.23; 296/182.1, 190.02, 296/193.09, 193.11
See application file for complete search history.

(56) References Cited

U.S. PATENT DOCUMENTS

| 3,572,813 | A | * | 3/1971 | Takada | 296/193.11 |
| 3,709,316 | A | * | 1/1973 | Glance | 180/69.21 |
| 5,101,921 | A | * | 4/1992 | West et al. | 180/69.21 |
| 6,460,916 | B2 | * | 10/2002 | Mizuta | 296/182.1 |
| 2009/0084619 | A1 | * | 4/2009 | Lin | 180/69.2 |

FOREIGN PATENT DOCUMENTS

JP    2001-191958    7/2001

* cited by examiner

*Primary Examiner* — John Walters
(74) *Attorney, Agent, or Firm* — Alleman Hall McCoy Russell & Tuttle LLP

(57) ABSTRACT

A utility vehicle includes a cover provided to cover an instrument panel in front of a driver seat, a hood which is configured to cover a space between a pair of right and left front wheels from above in front of the cover and is pivotable around a front end portion thereof so as to open and close, a stopper mechanism configured to retain the hood in a closed position, and a positioning mechanism configured to position the hood in the closed position with respect to the cover such that a rear end portion of the hood is fitted to a front end portion of the cover.

8 Claims, 17 Drawing Sheets

FORWARD ←
DOWNWARD ↓

UTILITY VEHICLE

TECHNICAL FIELD

The present invention relates to a utility vehicle which is suitable for driving off-road.

BACKGROUND ART

A utility vehicle for driving off-road is typically four-wheel drive. The utility vehicle is provided with a hood at the front portion of a vehicle body, seats in the vicinity of the center of the vehicle body and a cargo bed at the rear portion of the vehicle body. The hood covers a space between front wheels to protect instruments such as a suspension unit for front wheels accommodated in the space. A seat space in which the seats are arranged is surrounded by a cabin frame coupled to a vehicle body. To this end, coupling members are mounted to the vehicle body to couple the cabin frame to the vehicle body. To be specific, the coupling members coupled to the rear end portion of the cabin frame protrude upward from the vehicle body behind the seats, and the coupling members coupled to the front end portion of the cabin frame protrude from the vehicle body upward through an opening of the hood. In this structure, to open the space covered with the hood, it is necessary to pivot the hood upward along the coupling members and the cabin frame in such a manner that the coupling members and the cabin frame pass through the opening.

In the utility vehicle, to facilitate a maintenance operation for the instruments arranged in the space between the front wheels, the hood may be pivotable so as to open and close the space. When the utility vehicle is driving off-road, a great external force may be exerted on the vehicle body via the wheels. The hood which is pivotable tends to vibrate due to the external force. The vibration of the hood causes a noise or makes it difficult to retain the hood in a closed position.

SUMMARY OF THE INVENTION

A utility vehicle of the present invention comprises: a cover provided to cover an instrument panel in front of a driver seat; a hood which is configured to cover a space between a pair of right and left front wheels from above, in front of the cover, and is pivotable around a front end portion thereof so as to open and close; a stopper mechanism configured to retain the hood in a closed position; and a positioning mechanism configured to position the hood in the closed position with respect to the cover such that a rear end portion of the hood is fitted to a front end portion of the cover.

In accordance with such a configuration, when the pivotable hood is retained in the closed position by the stopper mechanism, it is positioned with respect to the cover by the positioning mechanism at the same time. This reduces a chance that the hood vibrates due to a large external force exerted on the hood during driving off-road. As a result, generation of a noise is suppressed, and the hood can be maintained in the closed position such that the hood is retained firmly.

The above and further objects, features and advantages of the present invention will more fully be apparent from the following detailed description of preferred embodiments with accompanying drawings.

DETAILED DESCRIPTION OF THE PREFERRED EMBODIMENTS

Hereinafter, an embodiment of the present invention will be described with reference to the drawings. As used herein, the direction is referenced from the perspective of a driver (not shown) seated in a utility vehicle.

Figure 1:
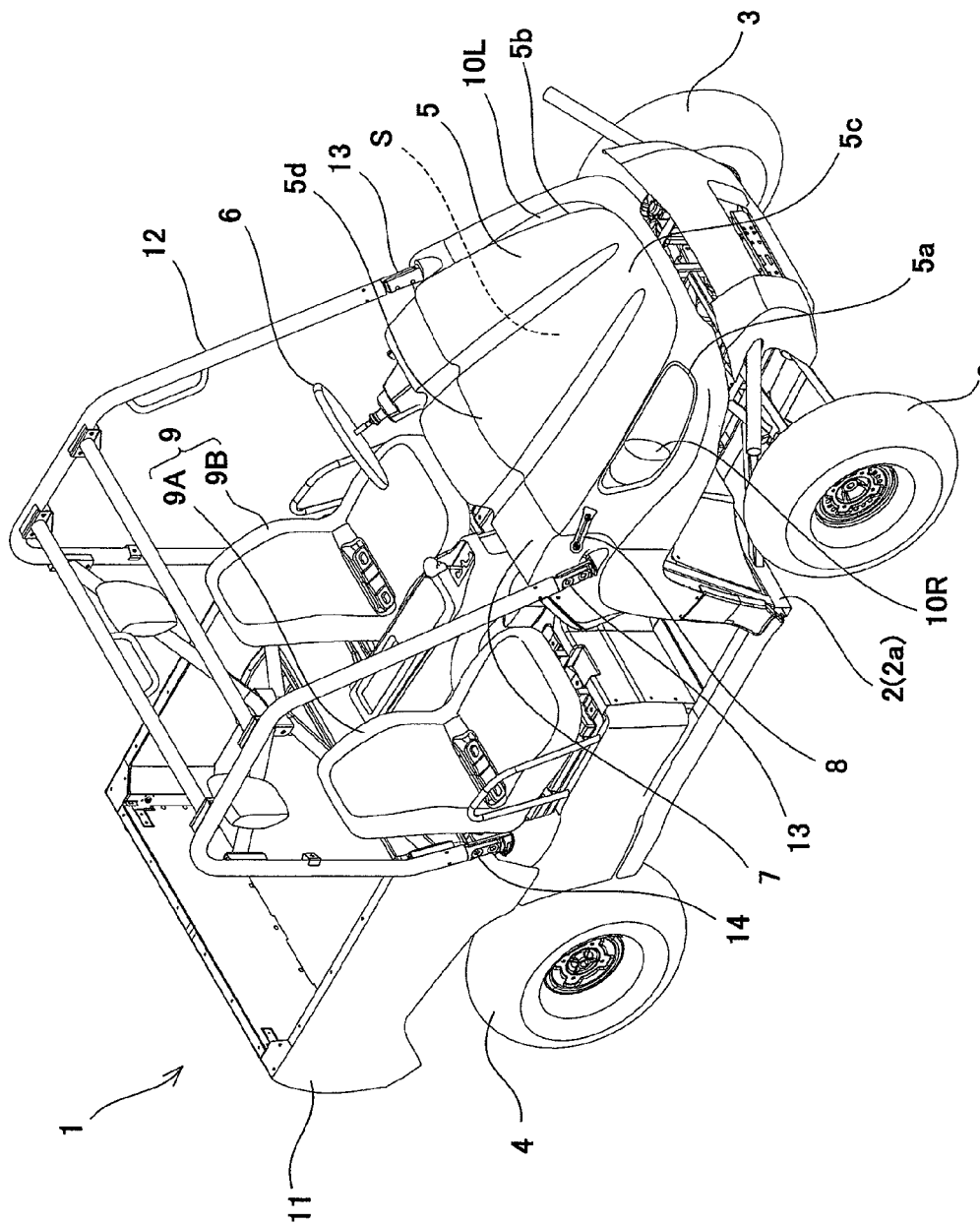
FIG. 1 is a perspective view of a utility vehicle according to an embodiment of the present invention.

FIG. 1 is a perspective view of a utility vehicle 1 according to an embodiment of the present invention. The utility vehicle 1 includes a pair of right and left front wheels 3 at the front portion of a vehicle body frame 2 and a pair of right and left rear wheels 4 at the rear portion of the vehicle body frame 2. A space S between the right and left front wheels 3 is covered with a hood 5 from above. The hood 5 is made of resin. The resin-made hood 5 is flexible, lightweight and can be formed to have a desired complex shape, as compared to a steel-made hood. The hood 5 is provided with a pair of openings 5a and 5b at right and left sides, respectively. A pair of head lamp devices 10R and 10L which are elongated in the forward and rearward direction are mounted to the openings 5a and 5b, respectively.

A rear end portion 5d of the hood 5 has a larger width in a rightward and leftward (vehicle width) direction of the vehicle body than a front end portion 5c of the hood 5. The hood 5 is pivotable around the front end portion 5c thereof so as to open and close. A cover 7 is provided in front of the seats 9 described later so as to cover an instrument panel 65 (see FIG. 2) on which a handle 6 or gauges are arranged. The rear end portion 5d of the hood 5 in a closed position is joined to a front portion 7b (see FIG. 2) of the cover 7 from above. The hood 5 in the closed position is retained by stopper mechanisms 8 such that its attitude is maintained.

A pair of right and left seats 9 (driver seat 9B and passenger seat 9A) are provided behind the hood 5 to be located in the vicinity of the center of the vehicle body in the forward and rearward direction. A cargo bed 11 is provided behind the seats 9. The cargo bed 11 extends rearward from a location which is in close proximity to the rear portion of the seats 9 through a region above the rear wheels 4.

A cabin frame 12, which is a so-called ROPS (rollover protective structure), is coupled to the vehicle body frame 2 so as to surround the seat space in which the seats 9 are arranged. The vehicle body frame 2 is provided with branch-shaped coupling members 13 and 14, i.e., the coupling members 13 at right and left front locations and the coupling members 14 at right and left rear locations, are provided to couple the cabin frame 12 to the vehicle body. The two front coupling members 13 penetrate through the cover 7 and protrude upward, while the two rear coupling members 14 are arranged between the seats 9 and the cargo bed 11. The cabin frame 12 is provided to extend from the both end portions of the cover 7 to a region behind the seats 9. With the hood 5 being in the closed position, the rear end portion 5d of the hood 5 is fitted to the front end portion 7b of the cover 7, and is located in front of the two front coupling members 13 and the front end of the cabin frame 12. Therefore, the hood 5 is openable and closable without interfering with the cabin frame 12.

The cabin frame 12 is formed by a cylindrical pipe which is made of metal. The cabin frame 12 surrounds the seat space and is open forward and rearward, rightward and leftward, and upward. The cabin frame 12 serves to protect the driver and the passenger and is used as a mounting member by which a roof or a hood for blocking rain or sunshine is mounted. That is, the utility vehicle 1 has no doors and no front glass. An engine unit (not shown) for driving the front wheels 3 and 4, an electric power supply unit (not shown) for supplying electric power to electric devices such as the head lamp devices 10R and 10L and the gauges, etc., are built into a space below the seats 9.

Figure 2:
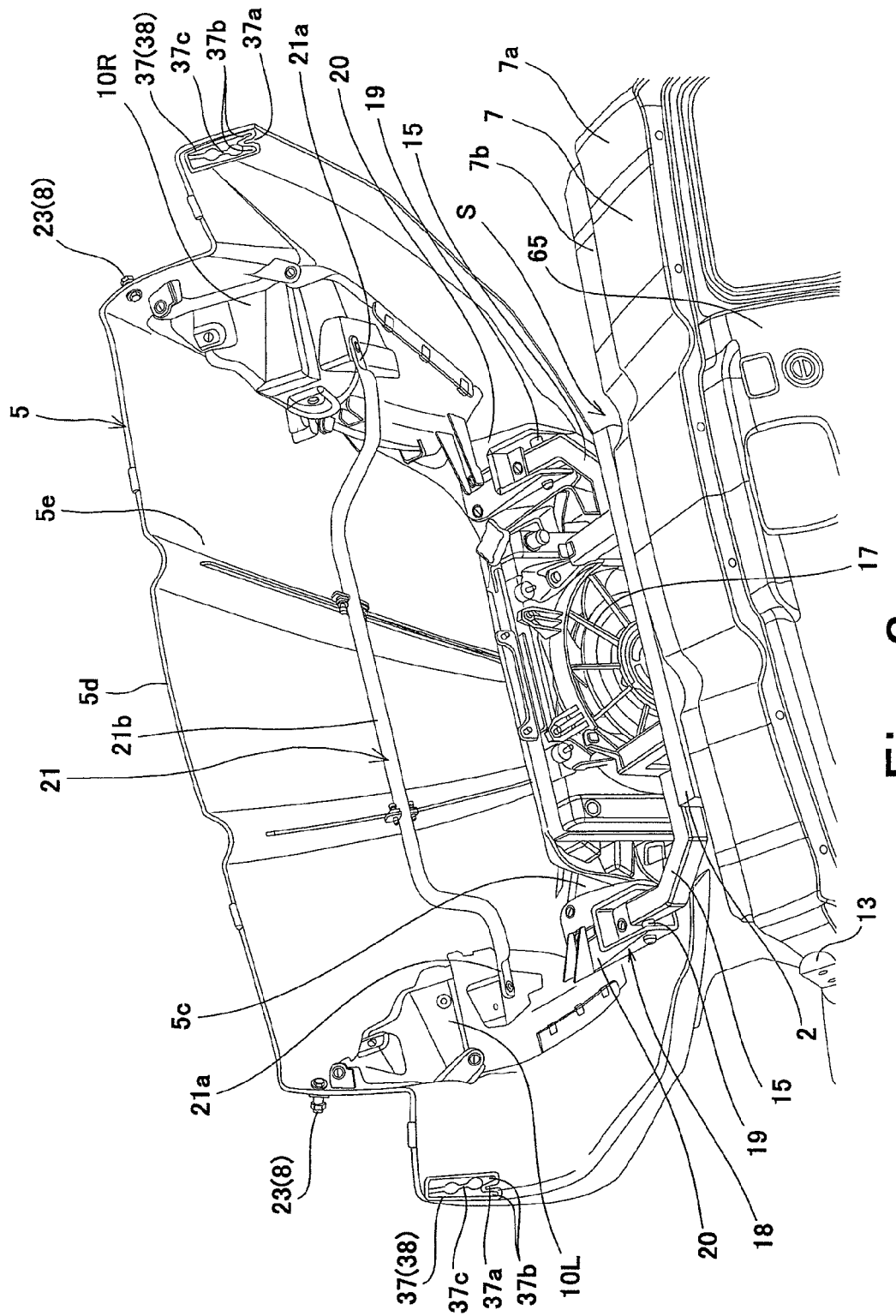
FIG. 2 is a perspective view of a hood in an open position and a region surrounding the hood, as viewed from a driver seat.

FIG. 2 is a perspective view of the hood 5 in an open position and a region surrounding the hood 5, as viewed from the driver seat 9B. As shown in FIG. 2, the hood 5 is coupled at the front end portion 5c to the vehicle body frame 2 by hinges 18. In the space S covered with the hood 5, the engine unit and the electric power supply unit are not arranged but a radiator 17 and the suspension unit (not shown) for front wheels are arranged. A pair of stays 15 extending at the right and left sides of the radiator 17 are coupled to the vehicle body frame 2. A rotational shaft 19 having an axis extending in the rightward and leftward direction (vehicle width direction) is provided at the front end portion of each stay 15. A metal-made connecting member 20 is fastened to the front end portion 5c of the hood 5 and is rotatably coupled to the rotational shaft 19. That is, the hinge 18 is constituted by the rotational shaft 19 and the connecting member 20.

The head lamp devices 10R and 10L are mounted to the openings 5a and 5b (see FIG. 1) of the hood 5, respectively, from the direction of the space S. A pipe-shaped support bar 21 which is made of stiff metal is provided to extend between the right and left head lamp devices 10R and 10L. The support bar 21 extends in the rightward and leftward along a surface 5e (hereinafter referred to as an inner surface 5e) of the hood 5 which is located on the space S side.

Right and left plate-shaped end portions 21a of the support bar 21 are fastened to the head lamp devices 10R and 10L, respectively, and an intermediate portion 21b of the support bar 21 is fastened to the inner surface 5e of the hood 5. Since the head lamp devices 10R and 10L which are relatively heavy components and the flexible hood 5 are supported by the stiff support bar 21, the right and left end portions of the hood 5 are less likely to be displaced downward. Therefore, the shape of the flexible hood 5 is maintained as designed. This makes it possible to avoid that the hood 5 is incompatible with the cover 7 in dimension.

Figure 3A:
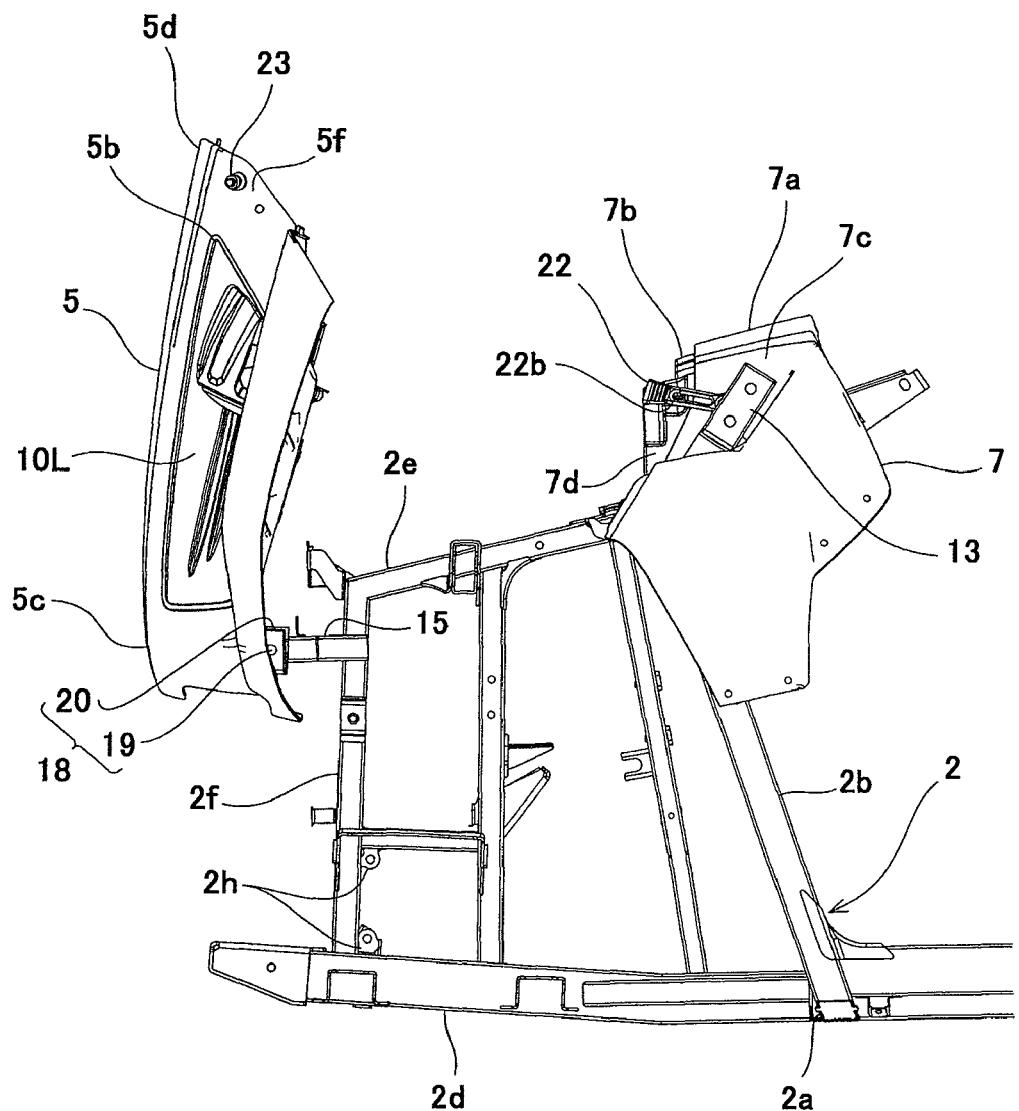
FIG. 3A is a side view of the hood in the open position and the region surrounding the hood.
Figure 3B:
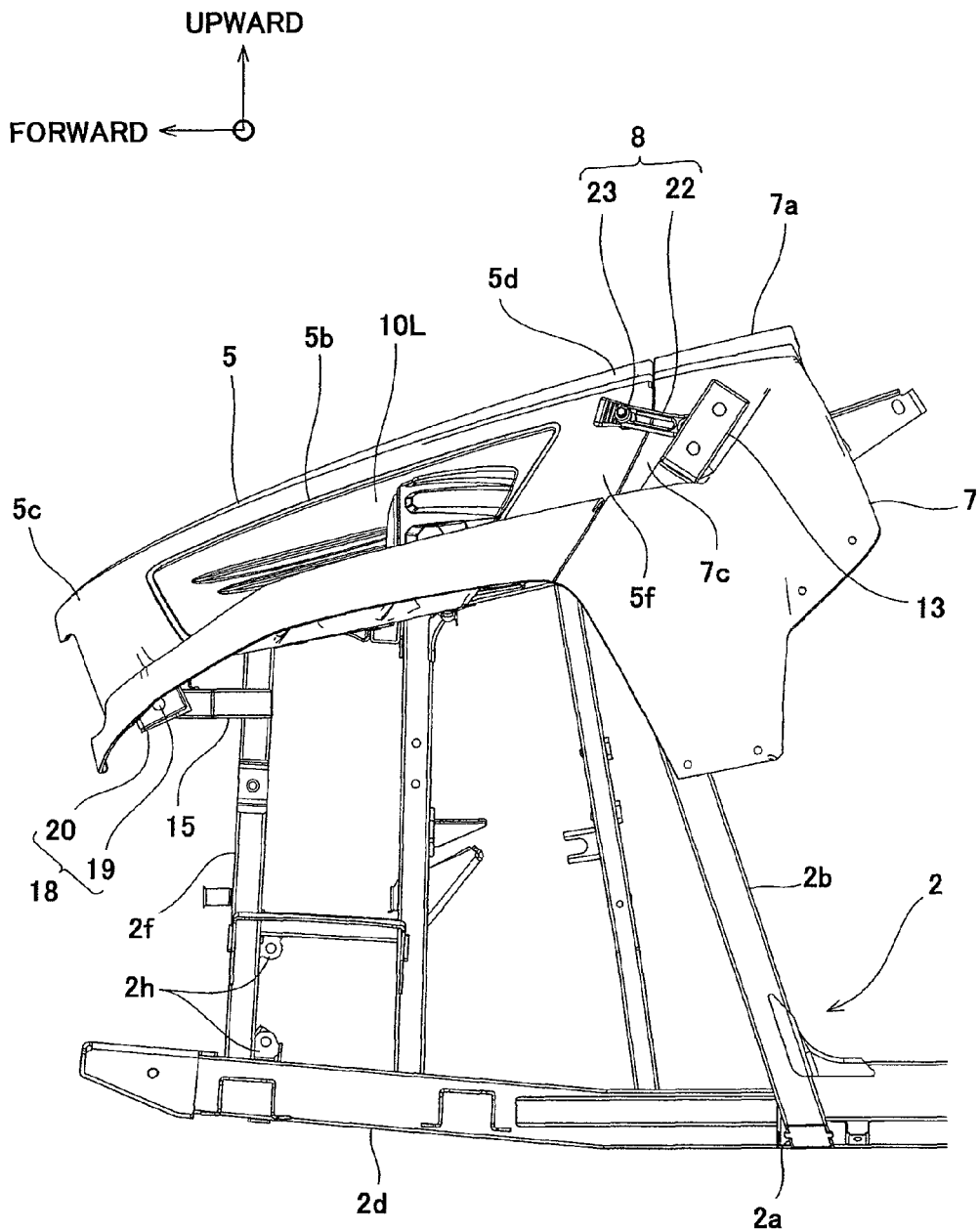
FIG. 3B is a side view of the hood in a closed position and the region surrounding the hood.

FIG. 3A is a side view of the hood 5 in an open position and the region surrounding the hood 5, and FIG. 3B is a side view of the hood 5 in a closed position and the region surrounding the hood 5. As shown in FIG. 3A, the vehicle body frame 2 has a main frame member 2a extending in a rightward and leftward direction at the front lower portion thereof. A pair of right and left masts 2b are respectively coupled to both ends of the main frame member 2a so as to extend upward. The upper end portions of the masts 2b are coupled to each other by a cross member 2c (see FIG. 7) extending in the rightward and leftward direction inside the cover 7. The front coupling members 13 are respectively coupled to the end portions of the cross member 2c such that the coupling members 13 penetrate through the cover 7 and protrude upward. A pair of right and left front frame members 2d extending forward are coupled to the main frame member 2a. The cross member 2c is coupled to the front frame members 2d by a pair of right and left brackets 2e. Each front bracket 2e has an inverted-L-shape and has an upright member 2f which extends upward at a substantially right angle at the front end portion of the front frame member 2d to form a forefront portion of the vehicle body frame 2.

Mounting members 2h are integrally provided at the lower portion of the upright member 2f to couple a suspension frame (not shown) to the vehicle body frame 2. The suspension frame extends substantially laterally from the mounting members 2h and the suspension unit (not shown) for front wheels is mounted to the tip end portion of the suspension frame. The stay 15 provided with the rotational shaft 19 protrudes forward from the upright member 2f. Therefore, the pivot of the hood 5 is located forward relative to the upright member 2f forming the forefront portion of the vehicle body frame 2 and the suspension unit for front wheels. For this reason, with the hood 5 in the open position, the space S between the front wheels 3 is wide open. Therefore, a maintenance operation for the instruments arranged in the space S is easily carried out.

As shown in FIG. 2 and FIG. 3A, the upper surface of the cover 7 and the side surface thereof connected to the upper surface have a step shape. The rear portion 7a of the cover 7 forms an upper portion and the front portion 7b of the cover 7 forms a lower portion. When the hood 5 is moved down in a rearward direction, the rear end portion 5d of the hood 5 covers the front portion 7b of the cover 7 and the outer surface of the hood 5 in the closed position is coplanar with the rear portion 7a of the cover 7 as shown in FIG. 3B. Thus, the rear end portion 5d of the hood 5 is fitted to the front portion 7b of the cover 7. In this configuration, the front end portion of the cover is partially covered with the rear end portion of the hood in a state where the hood is in the closed position. This improves the external appearance of the front portion of the utility vehicle 1 with the hood 5 being in the closed position.

After the hood 5 is moved down into the closed position, the stopper mechanisms 8 maintain the attitude of the hood 5. The utility vehicle 1 includes a pair of stopper mechanisms 8 which are symmetric in the rightward and leftward direction (see FIGS. 3B and 6). The stopper mechanism 8 includes an engagement member 22 and an outer projection 23. The engagement member 22 may be a rubber band, for example. The rubber band 22 is fixed to the side wall 7c of the rear portion 7a of the cover 7. The outer projection 23 is provided on an outer side surface 5f of the hood 5. An elongated engagement hole 22b formed on the rubber band 22 is engaged with the outer projection 23, maintaining the hood 5 in the closed position.

Figure 4:
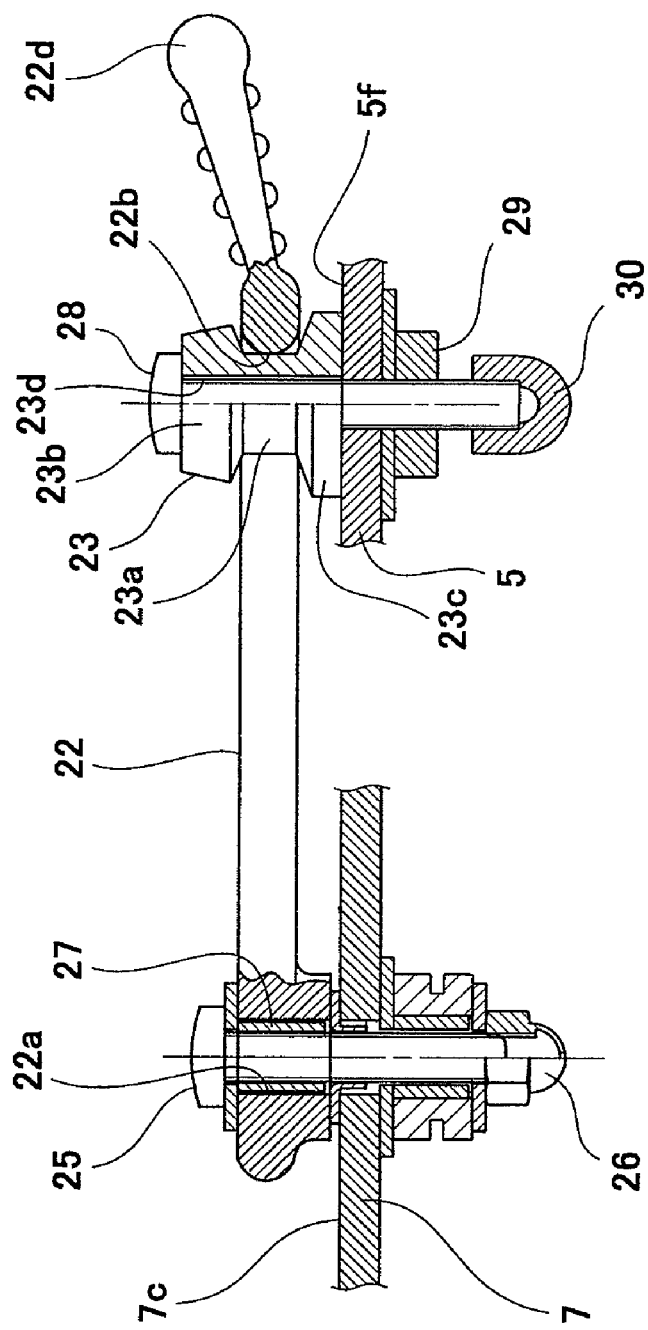
FIG. 4 is a cross-sectional view of a stopper mechanism for retaining the hood in the closed position.

FIG. 4 is a cross-sectional view of the stopper mechanism 8 retaining the hood 5 in the closed position. As shown in FIG. 4, the rubber band 22 is provided at one end portion thereof with a hole 22a into which a bolt 25 is inserted and is provided at the other end portion thereof with an engagement hole 22b with which the outer projection 23 is engageable. By inserting the bolt 25 into the hole 22a from outside the cover 7 and fastening the bolt 25 with a nut 26 from inside the cover 7, the rubber band 22 is fastened to the cover 7. A collar 27 is pressed into the hole 22a and is loosely fitted to the bolt 25. An operation portion 22d is integrally provided at the other end portion of the rubber band 22.

The outer projection 23 is made of metal and has a bobbin shape. To be specific, the outer projection 23 has a small-diameter cylindrical portion 23a at a center portion in the axial direction thereof and large-diameter portions 23b and 23c at both sides of the small-diameter cylindrical portion 23a in the axial direction. The large-diameter portions 23b and 23c have a larger diameter than the small-diameter cylindrical portion 23a. The outer projection 23 has a through-hole 23d extending axially. By inserting a bolt 28 into the through-hole 23d from outside and fastening the bolt 28 with a nut 29 from inside the hood 5, the outer projection 23 is fastened to the hood 5. A cap 30 is attached to the tip end portion of the bolt 28 which is located inside the hood 5. In the hood 5, the bolt 28 and the cap 30 form an inner projection protruding inside from the inner surface 5e.

With reference to FIGS. 3A, 3B and 4, after the hood 5 is moved from the open position to the closed position, a user grabs the operation portion 22d of the rubber band 22 and pulls and stretches the rubber band 22 in the longitudinal direction. The rubber band 22 is stretched from the location where the rubber band 22 is fastened to the cover 7. Since the collar 27 is fitted into the hole 22a, the inner periphery of the hole 22a will not be cut by a threaded portion of the bolt 25 when the rubber band 22 is pulled and stretched. Then, the outer large-diameter portion 23b is guided into the engagement hole 22b and the small-diameter cylindrical portion 23a is fitted into the engagement hole 22b to unstretch the rubber band 22. This causes the rubber band 22 to engage with the outer projection 23, maintaining the hood 5 in the closed position.

As shown in FIG. 4, the diameter of the engagement hole 22b is substantially equal to the outer diameter of the small-diameter cylindrical portion 23a and smaller than the outer diameter of the two large-diameter portions 23b and 23c. Therefore, in the state where the small-diameter cylindrical portion 23a engages with the engagement hole 22b, the outward movement of a portion of the rubber band 22 surrounding the engagement hole 22b is restricted by the outer large-diameter portion 23b. This reduces a chance that the rubber band 22 comes off from the outer projection 23 unless the user performs an operation for stretching the rubber band 22 in the longitudinal direction to release the closed position of the hood 5. As a result, the hood 5 is firmly retained in the closed position.

Figure 5:
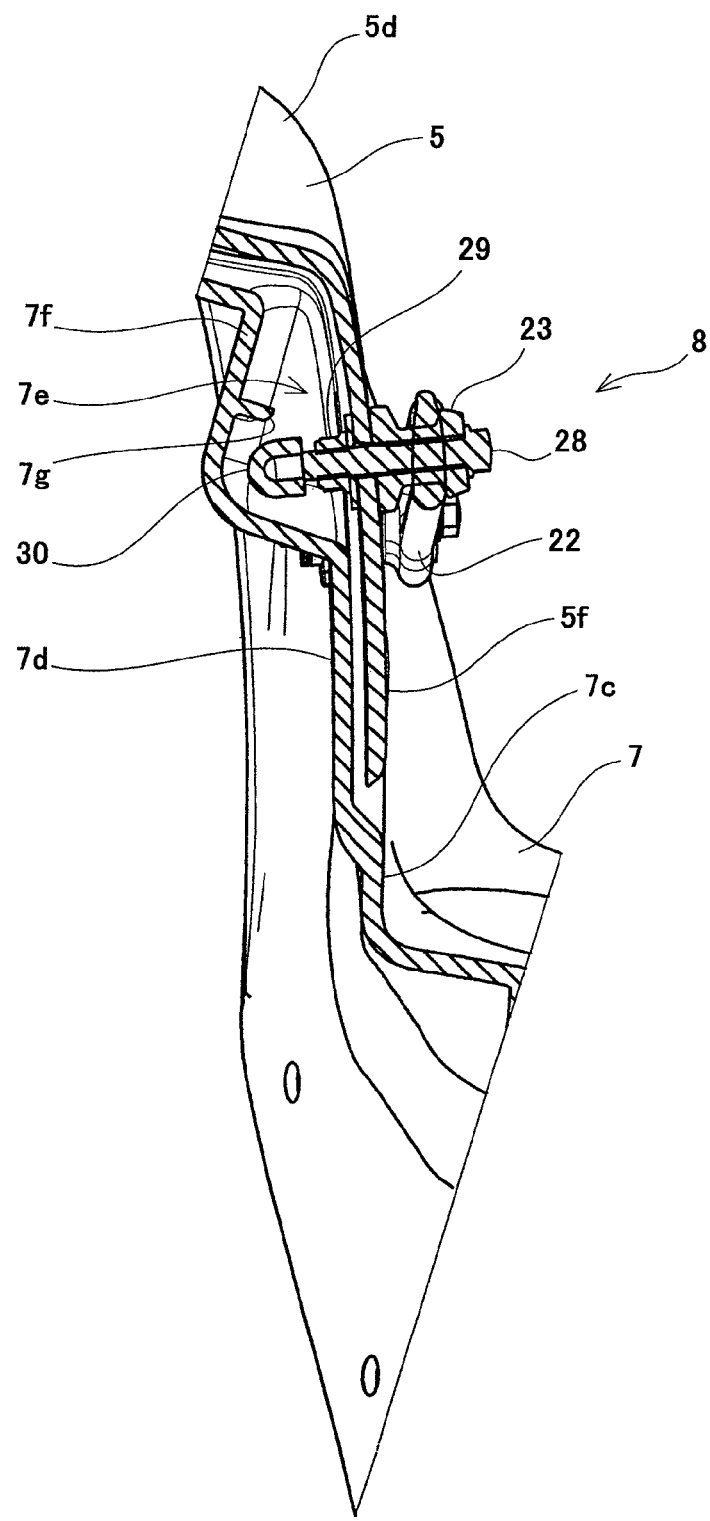
FIG. 5 is a longitudinal sectional view of the rear end portion of the hood retained in the closed position by the stopper mechanism.

FIG. 5 is a longitudinal sectional view of the rear end portion 5d of the hood 5 retained in the closed position by the stopper mechanism 8. As shown in FIG. 5, the side wall 7d of the front portion 7b of the cover 7 has an engagement groove 7e recessed toward the center in the rightward and leftward direction. A rib 7g protrudes from a vertical wall 7f defining the engagement groove 7e and extends horizontally within the engagement groove 7e.

When the hood 5 is moved down, the rear end portion 5d of the hood 5 covers the front portion 7b of the cover 7 as described above. The cap 30 located inside the hood 5 moves into the engagement groove 7e, moves beyond the rib 7b to a position under the rib 7g, and is engaged with the engagement groove 7e. When the utility vehicle 1 is driving off-road with the hood 5 being in the closed position, there is a chance that an external force is exerted on the vehicle body which may cause the rear end portion 5d of the pivotable hood 5 which is a free end to vibrate up and down. In this case, when the rear end portion 5d is about to be displaced upward, the cap 30 is brought into contact with the rib 7g and the state where the cap 30 is engaged with the engagement groove 7e is maintained, whereas when the rear end portion 5d is about to be displaced downward, the rear end portion 5d is brought into contact with the front portion 7b of the cover 7. In this way, the vertical displacement of the rear end portion 5d of the hood 5 is restricted, and thus, the hood 5 is less likely to vibrate.

Figure 6:
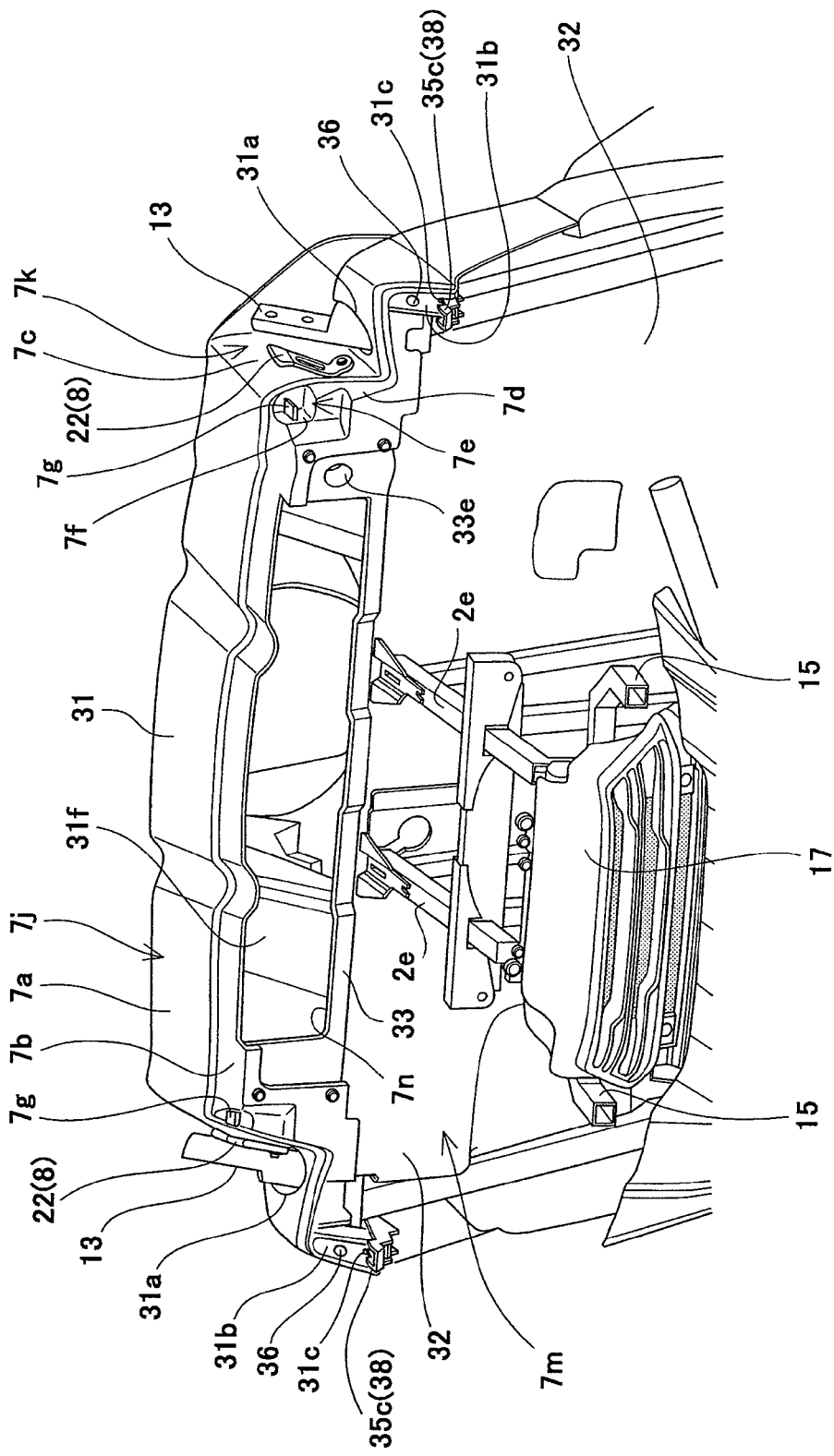
FIG. 6 is a perspective view of a front portion of a cover.

FIG. 6 is a perspective view of the cover 7 as viewed from front. As shown in FIG. 6, the cover 7 has a cover base portion 31. The cover base portion 31 has an upper wall 7j and a side wall 7k of the cover 7. The upper wall 7j has the above-described stepped upper surface. The side wall 7k has the side walls 7c and 7d having a step shape, the engagement groove 7e, and others. The cover base portion 31 is provided with through-holes 31a through which the coupling members 13 protrude upward, respectively. The cover base portion 31 is mounted to the vehicle body frame 2 attached with the coupling members 13 such that the coupling members 13 are inserted into the through-holes 31a, respectively.

The front surface of the cover base portion 31 is wide open. A front panel 32 of the cover 7 covers the lower portion of the front surface of the cover base portion 31. A bracket 33 which is elongated in the rightward and leftward direction and is U-shaped as viewed from the front is provided above the front panel 32. The front panel 32 and the bracket 33 form a front wall 7m of the cover 7. Since the cover 7 has the front wall 7m, there is a small chance that mud and other matter may splash into a space below the seats 9 (see FIG. 1) during driving off-road, making it possible to protect the engine unit and the electric power supply unit built into the space from the mud. The front end portion of the upper wall 7j of the cover 7 which is formed by the cover base portion 31 is cut with a large width to form a cut portion 31f. The cut portion 31f is formed only at the front portion 7b forming the lower portion of the upper surface of the cover 7 so as not to reach the rear portion 7a forming the upper portion.

Thereby, the cover 7 has an open portion 7n which is continuous with the upper wall 7j and the front wall 7m and is inverted-L shaped in cross-section. During normal driving, a lid (not shown) is fastened to the cover 7 to close the open portion 7n. By removing the lid by unfastening a threaded member, the user is able to see the back side of the instrument panel 65 (see FIG. 2) or the space below the seats 9 (see FIG. 1) through the open portion 7n from forward. In addition, the user is able to access the engine unit or the electric power supply unit by inserting a hand into the open portion 7n to carry out the maintenance operation. Since the upper wall 7j is cut to make the open portion 7n continuous with the upper wall 7j, a wide region behind the open portion 7n is visible from a location forward and above the open portion 7n, and the region behind the open portion 7n is more easily accessible as compared to a case where the open portion 7*n* is provided only at the front wall 7*m*.

The coupling member 13 for coupling the cabin frame 12 (see FIG. 1) to the vehicle body passes through the through-hole 31*a* of the cover base portion 31 so as not to interfere with the hood 5. On the other hand, because of this structure, in the state where the cabin frame 12 is coupled to the coupling member 13, it is very difficult to detach only the cover base portion 31 from the vehicle body frame 2. In view of this, the cover 7 is formed to have the open portion 7*n* so that the back side of the instrument panel 65 (see FIG. 2) or the space below the seats 9 (see FIG. 1) is easily visible. As should be understood, the utility vehicle 1 can avoid interference between the hood 5 and the coupling members 13 and make the maintenance operation easier.

The bracket 33 forming the front wall 7*m* of the cover 7 has a through-hole 33*e* through which the space below the seats 9 (see FIG. 1) communicates with the space S between the front wheels 3. A harness 63 (see FIGS. 14A and 14B) is provided to pass through the through-hole 33*e*. By the harness 63, the head lamp devices 10R and 10L (see FIG. 1) provided at the hood 5 are electrically connected to the electric power supply unit built into the space below the seats 9 (see FIG. 1).

Figure 7:
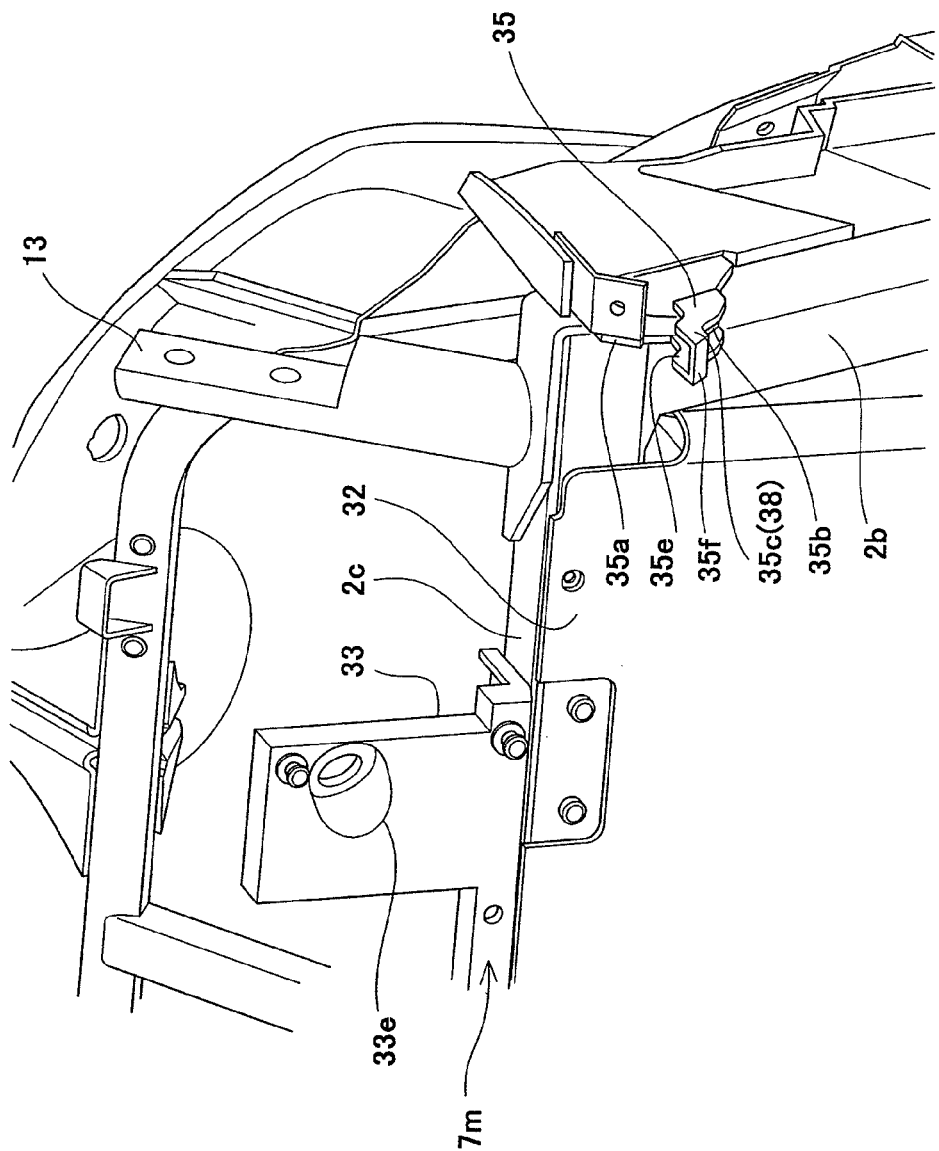
FIG. 7 is a perspective view of a positioning wall and a region surrounding the positioning wall before mounting a cover base portion to the hood.

FIG. 7 is a perspective view of a positioning wall 35*c* and a region surrounding the positioning wall 35*c* before mounting the cover base portion 31. As shown in FIG. 7, the bracket 33 is fastened to the upper surface of the cross member 2*c* of the vehicle body frame 2. An engagement plate 35 which is made of a plate metal material is fastened to the end portion of the cross member 2*c*. The engagement plate 35 has a stay portion 35*a* fastened to the side end surface of the cross member 2*c* and/or the side end surface of the mast 2*b*. A protruding portion 35*b* is provided at the front end of the stay portion 35*a* so as to protrude outward to the left in FIG. 7. The positioning wall 35*c* is provided at the tip end of the protruding portion 35*b* so as to protrude forward. A support wall 35*e* is provided at the base end of the protruding portion 35*b* so as to extend in parallel with the positioning wall 35*c*. The tip end portion of the protruding portion 35*b* is coupled to the tip end portion of the support wall 35*c* by a connecting portion 35*f* extending in the rightward and leftward direction. Since the tip end side and the base end side of the positioning wall 35*c* are supported by the support wall 35*e*, stiffness of the positioning wall 35*c* in the rightward and leftward direction is improved.

Turning back to FIG. 6, the cover base portion 31 has at the front end portion thereof walls 31*b* which have a flat-plate shape and protrude inside. The wall 31*b* extends vertically and has at the lower end portion thereof a slit 31*c* opening downward and extending upward. When the cover base portion 31 is mounted to the vehicle body frame 2 from above as described above, the positioning wall 35*c* is inserted into the slit 31*c* and the tip end of the positioning wall 35*c* protrudes forward from the wall 31*b*. A projection 36 is provided at the front end surface of the wall 31*b* in a location above the slit 31*c*.

Turning back to FIG. 2, right and left slit forming portions 37 are provided on right and left end portions of the inner surface 5*e* of the rear end portion 5*d* of the hood 5, respectively. Each slit forming portion 37 has a flat-plate shape and protrudes from the inner surface 5*e*. The slit 37*a* is formed at the lower end portion of the slit forming portion 37 such that the slit 37*a* opens downward and extends upward. A pair of retaining portions 37*b* are provided at the lower end portion of the slit forming portion 37 so as to branch from the slit 37*a* to the right and to the left. The slit 37*a* is formed by cutting the lower end portion of the slit forming portion 37. A groove 37*c* is recessed on the upper portion of the slit forming portion 37.

Figure 8:
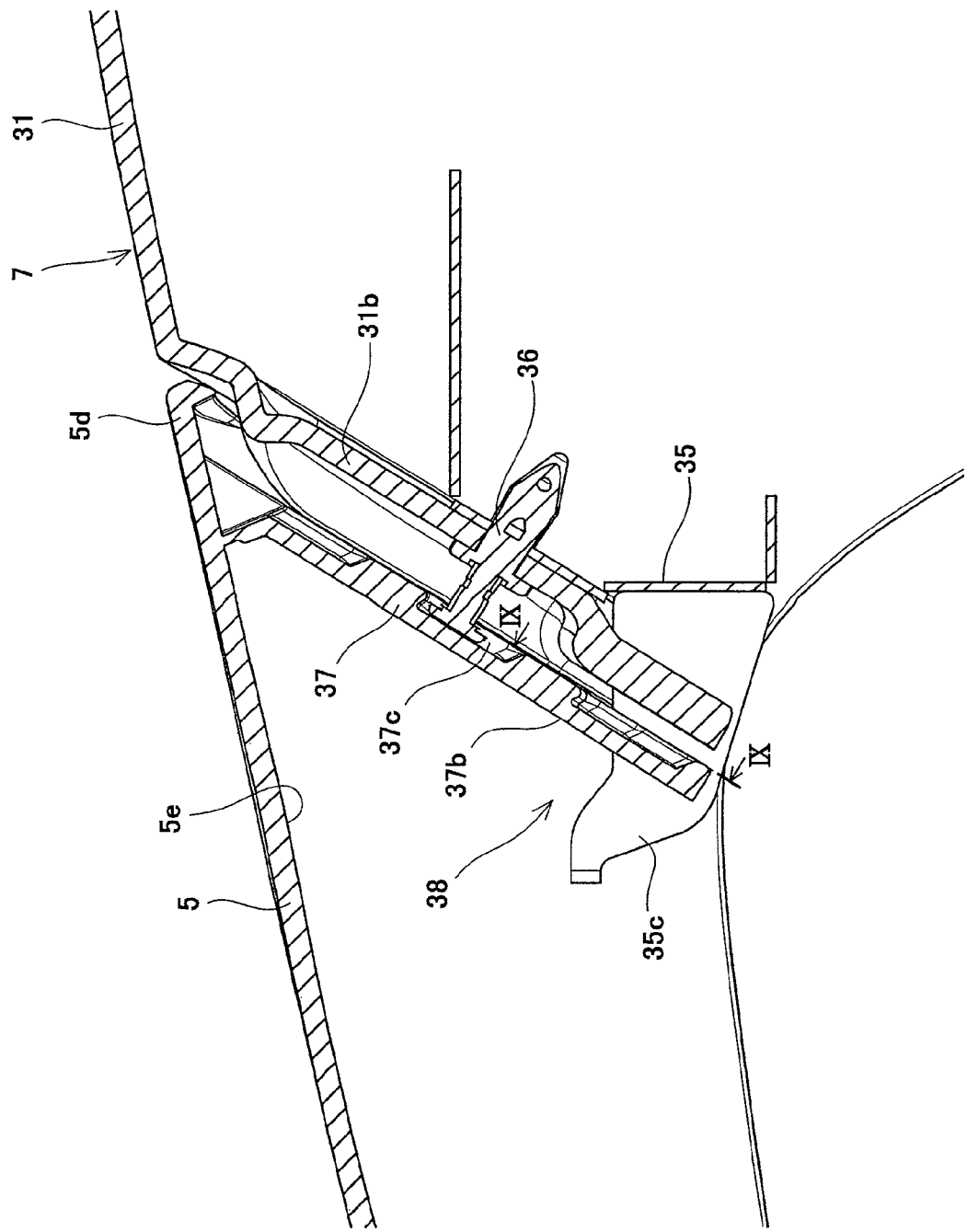
FIG. 8 is a side cross-sectional view of a positioning mechanism in a state where the hood is in the closed position.
Figure 9:
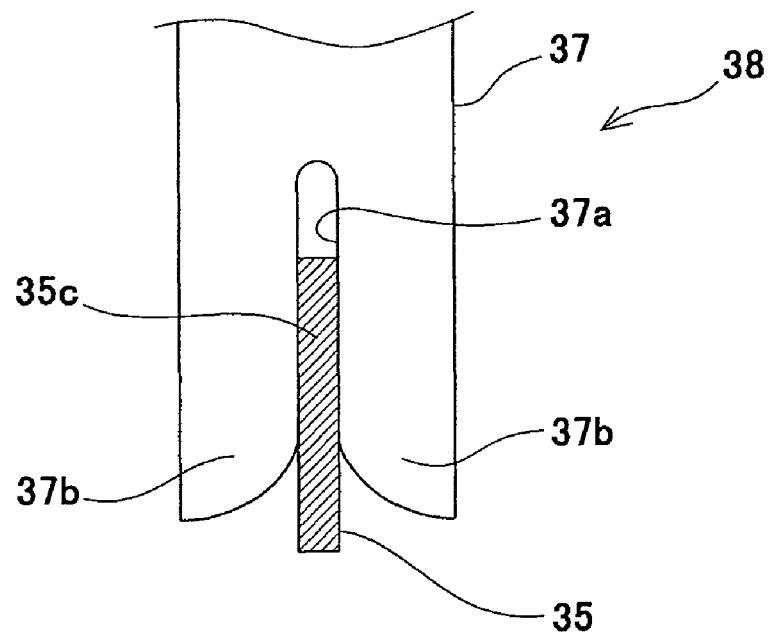
FIG. 9 is a partial cross-sectional view of a positioning mechanism taken along line IX-IX of FIG. 8.

FIG. 8 is a side cross-sectional view of the positioning mechanism 38 in a state where the hood 5 is in the closed position. FIG. 9 is a partial cross-sectional view of the positioning mechanism 38 taken along line IX-IX of FIG. 8. As shown in FIGS. 8 and 9, when the hood 5 is moved down into the closed position, the positioning wall 35*c* provided on the cover 7 is inserted into the slit 37*a* provided at the slit forming portion 37 so as to extend substantially vertically, and is sandwiched between the pair of retaining portions 37*b* of the slit forming portion 37. At this time, the positioning wall 35*c* is smoothly guided into the slit 37*a*, because the slit 37*a* has a tapered shape in which the width of its lower opening portion increases gradually in a downward direction (see FIG. 9). If the hood 5 is moved down in a state where the positioning wall 35*c* does not conform to the slit 37*a* in position in the rightward and leftward direction, the tip end of one of the retaining portions 37*b* contacts the upper end of the positioning wall 35*c*, and the hood 5 cannot be moved down into a fully closed position. That is, the slit forming portion 37 and the positioning wall 35*c* form the positioning mechanism 38 for positioning the hood 5 with respect to the cover 7 in the rightward and leftward direction. The utility vehicle 1 includes a pair of positioning mechanisms 38 which are symmetric in the rightward and leftward direction (see FIG. 6). Since the hood 5 in the closed position is positioned in the rightward and leftward direction by the positioning mechanism 38, the state where the resin-made hood 5 and the cover 7 are coplanar with each other, is maintained, improving the external appearance of the front portion of the utility vehicle 1.

When the utility vehicle 1 is driving off-road with the hood 5 being in the closed position, there is a chance that an external force is exerted on the vehicle body via the front wheels 3 which may cause the rear end portion 5*d* of the pivotable hood 5 which is a free end to vibrate up and down. However, since the pair of retaining portions 37*b* provided at the hood 5 tightly sandwiches the positioning wall 35*c* fixed on the cover 7, the vibration of the rear end portion 5*d* and hence vibration of the hood 5 in the rightward and leftward direction are prevented. In this manner, displacement of the hood 5 with respect to the cover 7 can be prevented suitably.

In the state where the hood 5 is in the closed position, the projection 36 provided on the wall 31*b* of the cover base portion 31 is received into the groove 37*c* of the slit forming portion 37. Since the projection 36 is fitted into the groove 37*c*, the hood 5 can be retained firmly in the closed position.

The wall 31*b* and the slit forming portion 37 are each tilted forward in a downward direction. Since the pivot of the hood 5 is provided at the front end portion thereof, it is possible to avoid interference between the wall 31*b* and the slit forming portion 37 when the hood 5 is pivoted from the open position to the closed position or from the closed position to the open position.

The positioning mechanism 38 is disposed inside the hood 5 and the cover 7 in the state where the hood 5 is in the closed position so that the external appearance of the utility vehicle 1 is not degraded. In addition, the right and left positioning mechanisms 38 are disposed outside, for example, the stopper mechanisms 8 provided on the outer side surfaces of the hood 5 and the cover 7 (see FIGS. 2 and 6). Since the right and left positioning mechanisms 38 are positioned to be widely spaced apart from each other in the rightward and leftward direction as described above, positioning accuracy of the hood 5 is improved and vibration of the hood 5 in the rightward and leftward direction can be suppressed surely. Since the portions of the hood 5 which are located outside the stopper mechanisms 8 in the rightward and leftward direction are free ends with respect to the portions where the stopper mechanisms 8 are disposed, they are likely to be displaced. However, since the hood 5 is positioned with respect to the cover 7 in these portions, the shape of the whole hood 5 is maintained.

Figure 10:
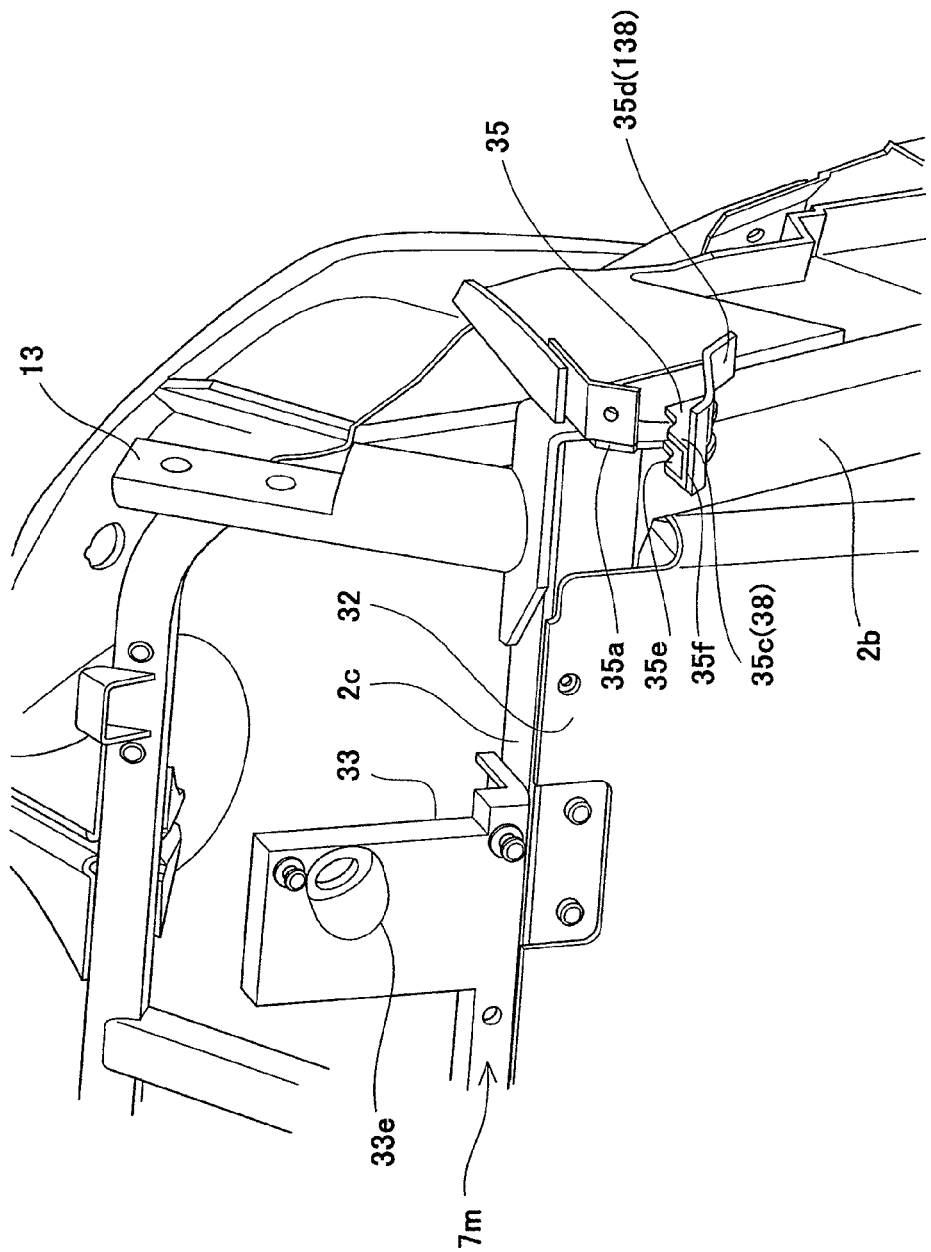
FIG. 10 is a perspective view of the positioning wall in a state where the cover is removed, according to a modification.
Figure 11:
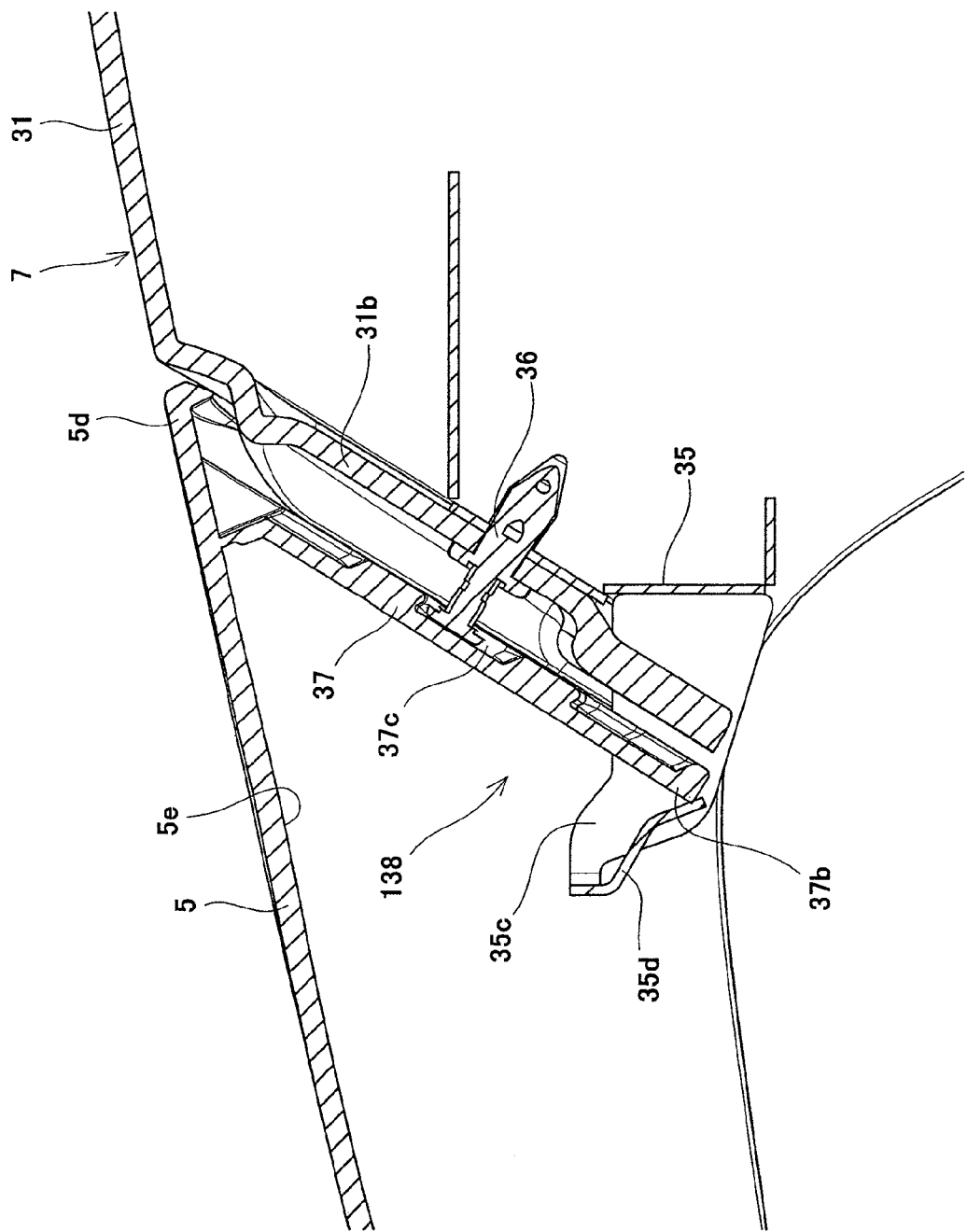
FIG. 11 is a partial cross-sectional view of the positioning mechanism retaining the hood in the closed position, according to the modification.

FIGS. 10 and 11 show a positioning mechanism 138 according to a modification. In the modification, also, a pair of positioning mechanisms 138 are provided. Only the left positioning mechanism 138 is shown in FIG. 10, and description of the right positioning mechanism 138 will be omitted for the sake of brevity as these mechanisms are similar to each other. As shown in FIG. 10, in this modification, a disengagement inhibiting wall 35d is provided at the front end of the positioning wall 35c of the engagement plate 35 such that the wall 35d protrudes to the left from the left outer end portion of a connecting portion where the positioning wall 35c is connected to the wall 35d.

As shown in FIG. 11, in this modification, when the hood 5 is moved down into the closed position, the positioning wall 35c is inserted into the slit 37c of the slit forming portion 37 in the above-described manner. When an attempt is made to move the hood 5 into a fully closed position, the tip end portion of the outer retaining portion of the pair of retaining portions 37b is pressed against the rear surface of the disengagement inhibiting wall 35d. In the state where the retaining portion 37b is pressed against the disengagement inhibiting wall 35d in this way, the pivot operation of the hood 5 to the open position is restricted. Thus, the hood 5 can be retained firmly in the closed position.

Since the positioning wall 35c is inserted through the slit 37c of the slit forming portion 37 in the forward and rearward direction in the state where the hood 5 is in the fully closed position, the tip end portion of the positioning wall 35c is located forward relative to the slit forming portion 37. The disengagement inhibiting wall 35d is continuous with the front end of the positioning wall 35c and is tilted rearward in a downward direction. This makes it possible to avoid interference between the retaining portions 37b and the disengagement inhibiting wall 35d, when the hood 5 is moved down, the slit forming portion 37 reaches a location above the positioning wall 35c and fitting of the positioning wall 35c into the slit 37c starts.

Figure 12:
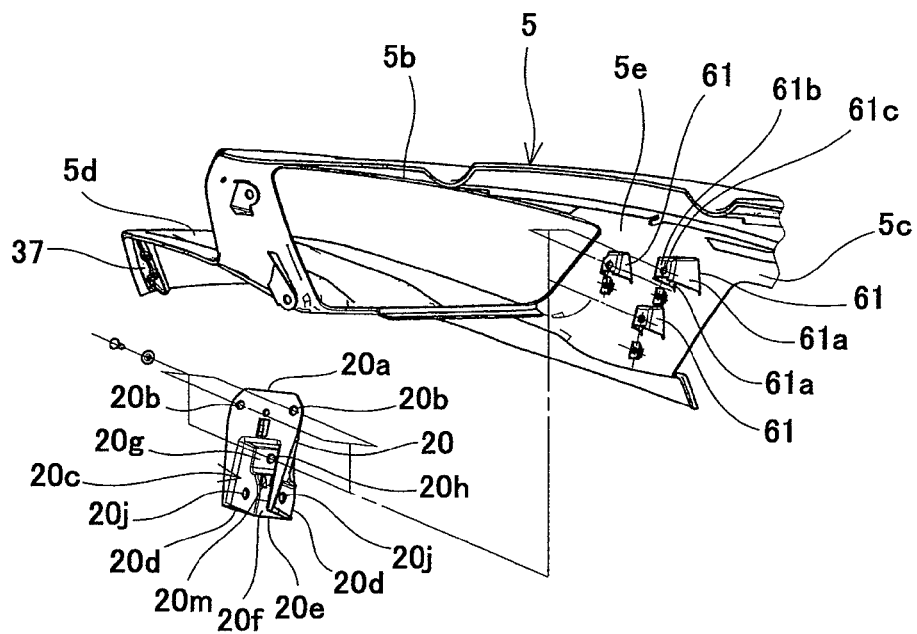
FIG. 12 is an exploded perspective view of a part of the hood before mounting connecting members to the hood.

FIG. 12 is an exploded perspective view of a part of the hood 5 before attaching the connecting member 20 to the hood 5. As shown in FIG. 12, the connecting member 20 forming the hinge 18 (see FIG. 2) as described above is made of metal and is separate from the resin-made hood 5. Plural mounting seats 61 are provided on the inner surface 5e of the hood 5 to mount the connecting member 20 to the hood 5. The number of the mounting seats 61 may be changed as desired. In this embodiment, one set of three mounting seats 61 are illustrated. Two sets of mounting seats 61 are provided at right and left sides at the front end portion of the hood 5. Each mounting seat 61 has a pair of upright portions 61a extending from the inner surface 5e of the hood 5 and a seat portion 61b connecting the tip end portions of the upright portions 61a to each other. The seat portion 61b has a through-hole 61c. Two mounting seats 61 are provided on the back side of the front end portion 5d and one mounting seat 61 is provided on the front side of the front end portion 5d.

The connecting member 20 has a base portion 20a of a flat-plate shape. One end portion of the base portion 20a is supported by the seat portions 61b of the two mounting seats 61 at the back side. Two through-holes 20b are formed on the one end portion of the base portion 20a so as to conform to the through-holes 61c of the two seat portions 61b, respectively. The base portion 20a has at the other end portion thereof a recess 20c for receiving the front end portion of the stay 15 (see FIG. 2). The recess 20c is defined by a pair of side walls 20d extending vertically from the base portion 20a and a bottom wall 20e connecting the side walls 20d to each other. Thus, the recess 20c is U-shaped in cross-section.

The bottom wall 20e has a step shape and includes a first bottom wall 20f at the front side of the bottom wall 20e and a second bottom wall 20g at the back side. The first bottom wall 20f is recessed with a larger amount with respect to the base portion 20a than the second bottom wall 20g. The front end portion of the stay 15 (see FIG. 2) is received in the front side of the recess with a larger recess amount. A through-hole 20j is provided at the front side of each side wall 20d. By inserting the rotational shaft 19 (see FIG. 2) into the through-holes 20j, the connecting member 20 is mounted to the stay 15 (see FIG. 2) received in the recess 20c. The second bottom wall 20g is supported on the seat portion 61b of the mounting seat 61 on the front side. The second bottom 20f has a through-hole 20h conforming to the through-hole 61c of the seat portion 61b. Plural ribs 20m protrude from a connecting wall 20k (see FIG. 13A) connecting the first bottom wall 20f to the second bottom wall 20g.

The connecting member 20 is fastened to the hood 5 by placing the rear surface of the base portion 20a and the rear surface of the second bottom wall 20g on the associated seat portion 61b and inserting a bolt into the through-hole. The mounting seat 61 has the upright portion 61a. The seat portion 61b on which the connecting member 20 is placed, is distant from the inner surface 5e of the hood 5. Although the first bottom wall 20f is recessed with a larger amount with respect to the base portion 20a to receive the stay 15 (see FIGS. 13A and 13B), the rear surface of the first bottom wall 20f will not interfere with the inner surface 5e of the hood 5.

Figure 13A:
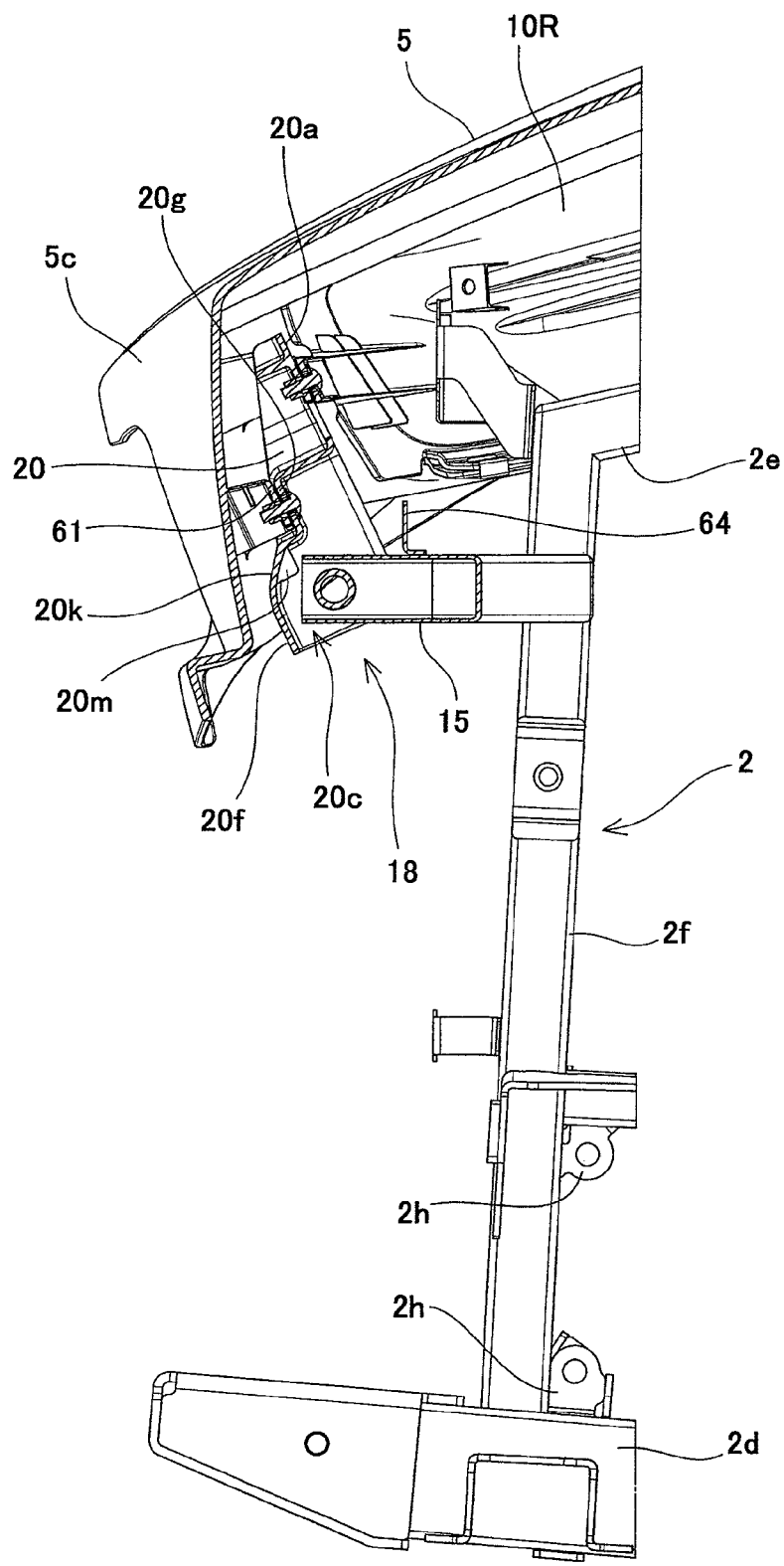
FIG. 13A is a partial cross-sectional view of the hood in the closed position and the region surrounding the hood, as viewed from the side.
Figure 13B:
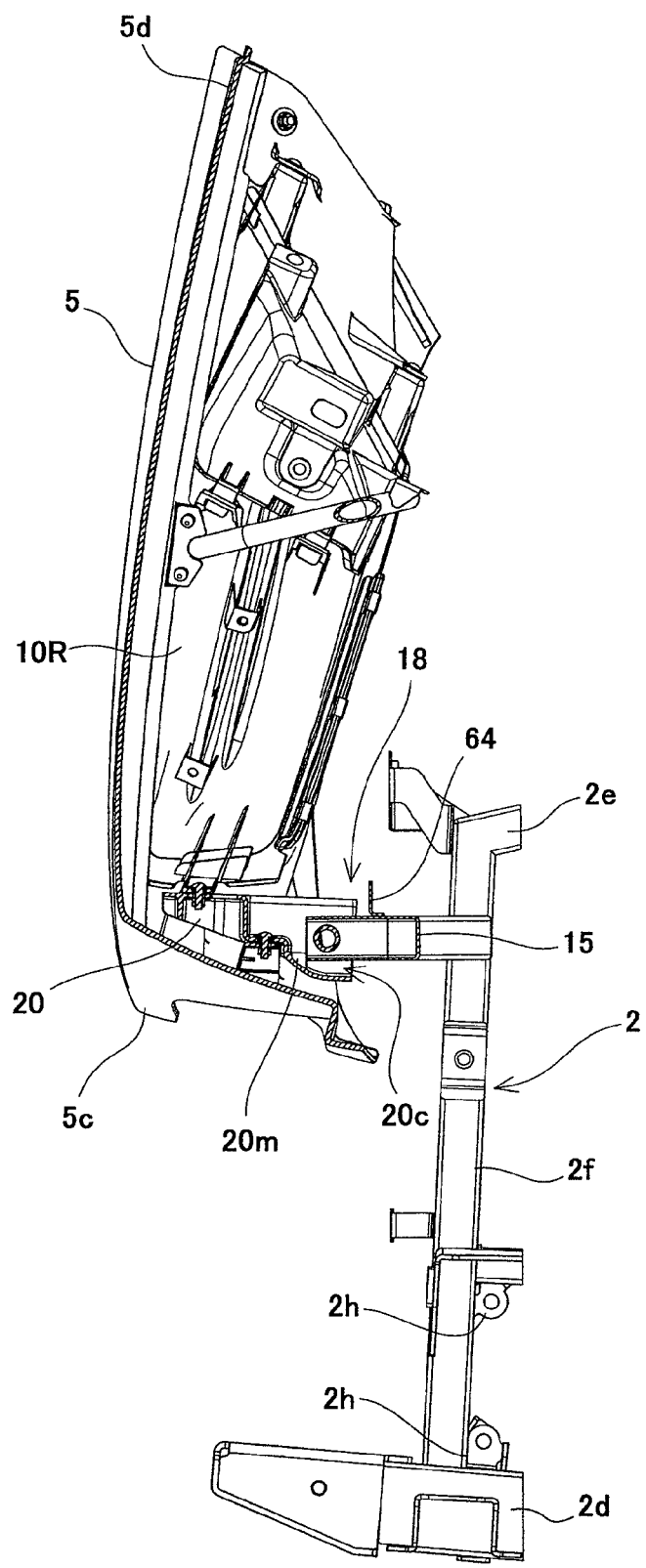
FIG. 13B is a partial cross-sectional view of the hood in the open position and the region surrounding the hood, as viewed from the side.

FIG. 13A is a partial cross-sectional view of the hood 5 in the closed position and the region surrounding the hood 5, as viewed from the side, and FIG. 13B is a partial cross-sectional view of the hood 5 in the open position and the region surrounding the hood 5, as viewed from the side. As shown in FIG. 13A, in the state where the hood 5 is in the closed position, a rib 20m of the connecting member 20 is positioned forward and above relative to the pivot, and the front end surface of the stay 15 is distant from the rib 20m. Under this state, when the hood 5 is pivoted to the open position, the connecting member 20 is pivoted around the pivot together with the hood 5. In this case, the rib 20m of the connecting member 20 moves downward through a region forward of the stay 15.

As shown in FIG. 13B, when the hood 5 continues to be pivoted to be placed in the open position, the rib 20m contacts the lower portion of the front end surface of the stay 15 in a state where the hood 5 is in a substantially upright position. Since the rib 20m cannot be pivoted around the lower side of the stay 15, the hood 5 cannot be pivoted further forward.

In the above-described manner, the pivot operation of the hood 5 toward the open position is restricted by the rib 20m of the connecting member 20 and the stay 15. Thus, the connecting member 20 functions as a restricting member that is provided at the hood and configured to cooperate with the vehicle body frame 2 to restrict a pivot operation of the hood 5. It will be appreciated that rib 20m is one of plural ribs 20m that may be included in the restricting member. Each of the plural ribs 20m may be provided to extend from an inner surface of the hood 5 in a direction that is substantially perpendicular to the inner surface. The pivot operation of the hood 5 is restricted in such a manner that the plural ribs 20m are configured to contact a frame member of the vehicle body frame 2 which is disposed in the space between the front wheels 3 by pivoting the hood 5. In this restricted state, it is desired that the hood 5 be subjected to a rotational moment generated by the weight of the hood 5 to cause the hood 5 to be pivoted forward. Since the rotational moment is supported by the stay 15 in contact with the rib 20*m*, the hood 5 maintains the open position if the user releases the hand from the hood 5. Thus, it is possible to avoid that the hood 5 is inadvertently moved down in a rearward direction.

In this state, as shown in FIG. 13B, the pivot operation of the hood 5 is restricted while maintaining the substantially upright position. This reduces the load to be supported by the stay 15. Therefore, it is not necessary to improve stiffness of the stay 15 and the rib 20*m*. In this embodiment, the connecting member 20 is separate from the resin-made hood 5 and is made of a stiff metal material. This enables the connecting member 20 to have sufficient stiffness.

The resin-made hood 5 can be integrally formed to have a complex shape. In a case where the rib 20*m* for restricting the pivot operation of the hood 5 is formed integrally with the hood 5 using resin, it is desirable to form the rib 20*m* in a solid state to ensure stiffness. However, if the solid rib is caused to protrude from the inner surface 5*e* of the resin-made hood 5 manufactured by molding, there is a chance that a groove is formed at a portion of the outer surface of the hood 5 where the rib 20*b* is formed. In this embodiment, since the rib 20*m* is separate from the hood 5, it is possible to prevent that such a groove is formed on the outer surface of the hood 5. As a result, the external appearance of the hood 5 will not be degraded.

Although in this embodiment, the rib 20*m* is provided integrally with or separately from the hood 5 to restrict the pivot operation of the hood 5, any other member may be used so long as it is capable of cooperating with the stay 15 to restrict the pivot operation of the hood 5. For example, instead of the rib 20*m*, a block-shaped part may be provided integrally with or separately from the hood 5.

Figure 14A:
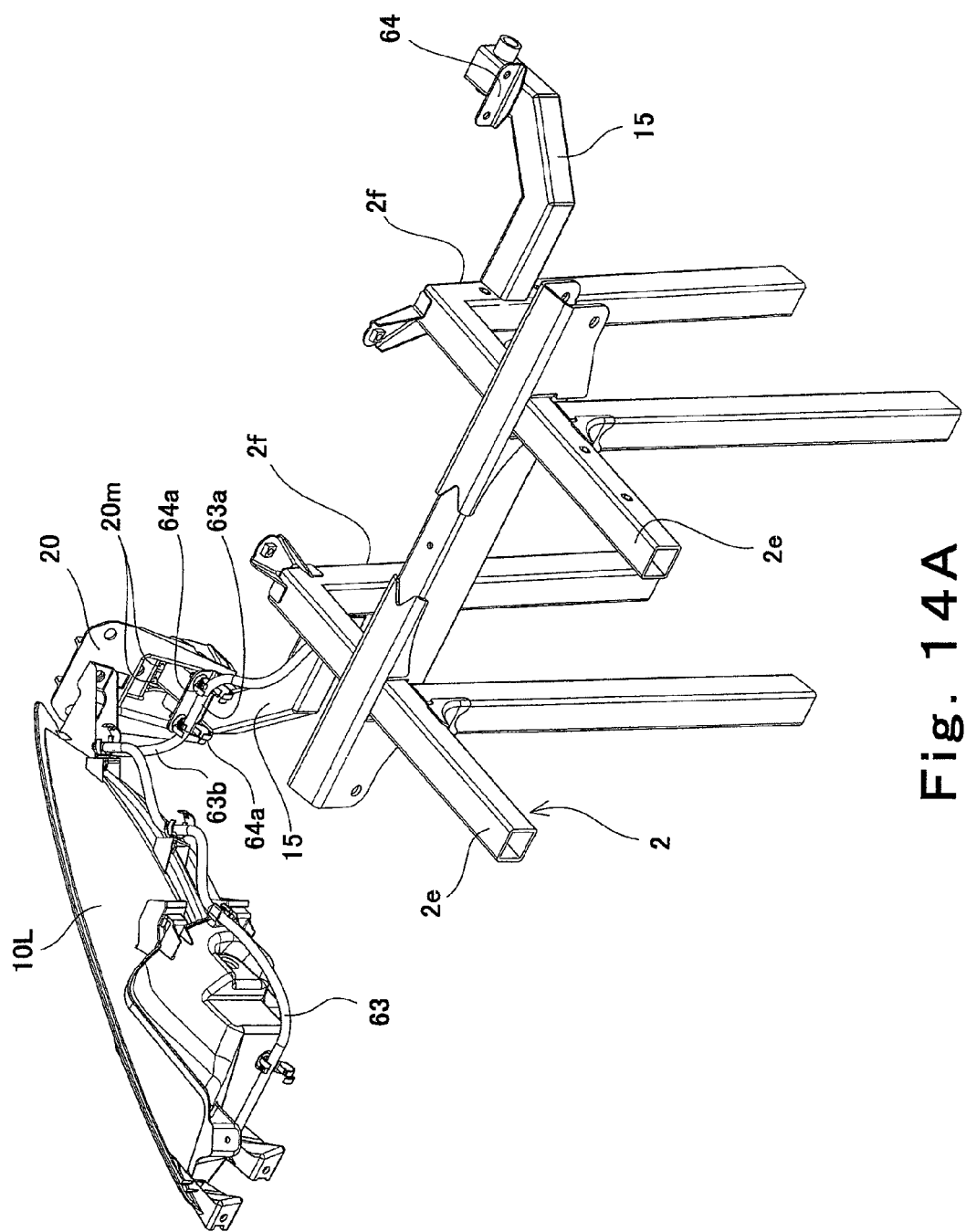
FIG. 14A is a perspective view showing arrangement of a harness in the state where the hood is in the closed position.
Figure 14B:
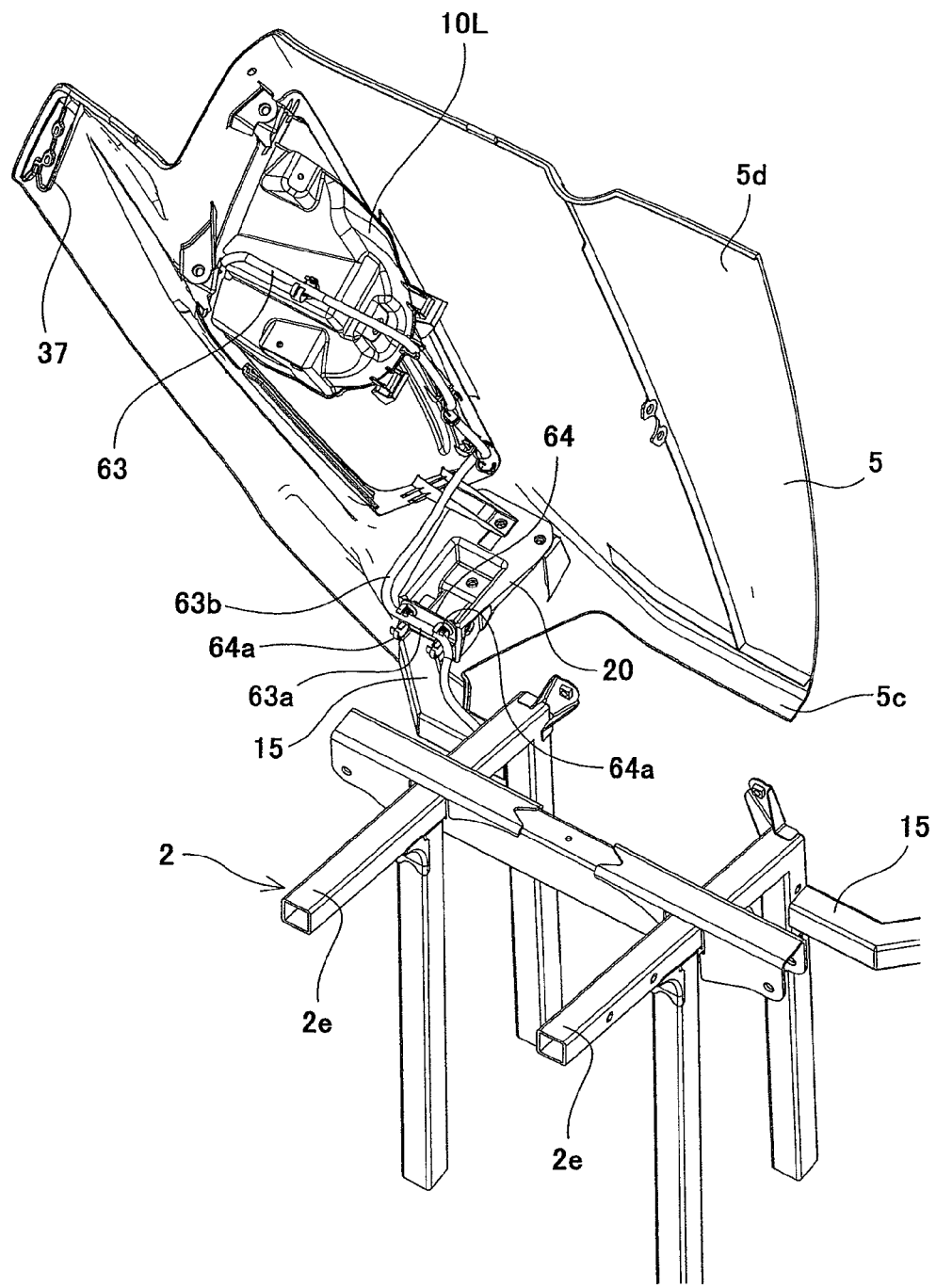
FIG. 14B is a perspective view showing arrangement of the harness in the state where the hood is in the open position.

FIG. 14A is a perspective view showing arrangement of a harness 63 in the state where the hood 5 is in the closed position, and FIG. 14B is a perspective view showing arrangement of the harness 63 in the state where the hood 5 is in the open position. As shown in FIG. 14A, the harness 63 is connected to the head lamp device 10L. Electric power is supplied from the electric power supply unit (not shown) built in the space below the seats 9 (see FIG. 1) through the harness 63. A harness retaining member 64 for retaining the harness 63 is attached on the upper surface of the stay 15. The harness retaining member 64 is attached with two clips 64*a* at the right and left sides, respectively. The two clips 64*a* serve to retain the harness 63. The harness 63 includes a fixed portion 63*a* retained by the harness retaining member 64 and fixed to the vehicle body frame 2 side and a pivot portion 63*b* extending continuously with the fixed portion 63*a* and coupled to the head lamp device 10L. The fixed portion 63*a* is fixed to the vehicle body frame 2 side so as to extend in the rightward and leftward direction based on the arrangement of the two clips 64*a*. That is, the axial direction of the fixed portion 63*a* conforms to the axial direction of the rotational shaft 19 (see FIG. 2).

With reference to FIGS. 14A and 14B, the pivot portion 63*b* of the harness 63 is pivoted around the axis of the fixed portion 63*a* according to the pivot operation of the hood 5. According to the pivot operation, the pivot portion 63*b* of the harness 63 is twisted with respect to the fixed portion 63*a*. This reduces a chance that the harness 63 is cut.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle, comprising:
a cover provided to cover an instrument panel located in front of a driver seat;
a hood which is configured to cover a space between a pair of right and left front wheels from above in front of the cover and is pivotable around a front end portion thereof so as to open and close;
a stopper mechanism configured to retain the hood in a closed position; and
a positioning mechanism configured to position the hood in the closed position with respect to the cover such that a rear end portion of the hood is fitted to a front end portion of the cover,
wherein the positioning mechanism includes:
a positioning wall provided at the front end portion of the cover so as to extend in a forward and rearward direction;
a slit forming portion provided at the rear end portion of the hood and having a slit; and
a disengagement inhibiting wall extending from a front end of the positioning wall in a vehicle width direction,
wherein the positioning wall is inserted into the slit in a state where the hood is in the closed position.

2. The utility vehicle according to claim 1, wherein the slit forming portion is pressed against a rear surface of the disengagement inhibiting wall in the state where the hood is in the closed position.

3. The utility vehicle according to claim 2, wherein the positioning mechanism is provided outside the stopper mechanism in the vehicle width direction.

4. A utility vehicle, comprising:
a cover provided to cover an instrument panel located in front of a driver seat;
a hood which is configured to cover a space between a pair of right and left front wheels from above in front of the cover and is pivotable around a front end portion thereof so as to open and close;
a stopper mechanism configured to retain the hood in a closed position; and
a positioning mechanism configured to position the hood in the closed position with respect to the cover such that a rear end portion of the hood is fitted to a front end portion of the cover,
wherein the front end portion of the cover is partially covered with the rear end portion of the hood in a state where the hood is in the closed position;
wherein the stopper mechanism includes an outer projection and an inner projection provided at the rear end portion of the hood so as to protrude outside and inside the hood, respectively, an engagement member fixed to a portion of the front end portion of the cover which is not covered with the hood, and an engagement groove provided at a portion of the front end portion of the cover which is covered with the hood; and wherein the inner projection is engaged with the engagement groove and the engagement member is engaged with the outer projection in the state where the hood is in the closed position.

5. A utility vehicle, comprising:
a cover provided to cover an instrument panel located in front of a driver seat;
a hood which is configured to cover a space between a pair of right and left front wheels from above in front of the cover and is pivotable around a front end portion thereof so as to open and close;
a stopper mechanism configured to retain the hood in a closed position;
a positioning mechanism configured to position the hood in the closed position with respect to the cover such that a rear end portion of the hood is fitted to a front end portion of the cover; and
a restricting member provided at the hood and configured to cooperate with a vehicle body frame to restrict a pivot operation of the hood,
wherein the restricting member includes plural ribs provided to extend from an inner surface of the hood, and the pivot operation of the hood is restricted in such a manner that the plural ribs are configured to contact a frame member of the vehicle body frame which is disposed in the space between the front wheels by pivoting the hood.

6. The utility vehicle according to claim 5, wherein the restricting member is separate from the hood.

7. A utility vehicle, comprising:
a cover provided to cover an instrument panel located in front of a driver seat;
a hood which is configured to cover a space between a pair of right and left front wheels from above in front of the cover and is pivotable around a front end portion thereof so as to open and close;
a stopper mechanism configured to retain the hood in a closed position;
a positioning mechanism configured to position the hood in the closed position with respect to the cover such that a rear end portion of the hood is fitted to a front end portion of the cover;
a head lamp device fastened to the hood;
a harness electrically connected to the head lamp device; and
a harness retaining member configured to retain the harness with respect to a vehicle body frame,
wherein the harness includes a fixed portion fixed to the vehicle body frame by the harness retaining member and a pivot portion which extends continuously with the fixed portion and is coupled to the head lamp device; and
wherein the pivot portion is pivotable around an axis of the fixed portion according to a pivot operation of the hood.

8. The utility vehicle according to claim 7, wherein
a suspension frame for supporting a suspension for front wheels disposed at a front portion of the utility vehicle and a stay protruding forward from the suspension frame are arranged in the space between the front wheels; and
wherein the front end portion of the hood is coupled to a tip end of the stay such that the hood is pivotable around the front end portion.

* * * * *